United States Patent [19]

Beckwith

[11] 3,839,098

[45] Oct. 1, 1974

[54] COMPOSITION AND METHOD FOR PRODUCING BLACK COATING ON BRASS

[75] Inventor: Merton M. Beckwith, Rockville, Conn.

[73] Assignee: Conversion Chemical Corporation, Rockville, Conn.

[22] Filed: Nov. 9, 1972

[21] Appl. No.: 304,966

[52] U.S. Cl. ............................ 148/6.14 R, 148/6.24
[51] Int. Cl. .............................................. C23f 5/02
[58] Field of Search ................... 148/6.14 R, 6, 6.24

[56] References Cited
OTHER PUBLICATIONS

Fishlock, Metal Colouring, Robert Draper Ltd., 1962, pp. 203–205.

Primary Examiner—Ralph S. Kendall

[57] ABSTRACT

An aqueous bath for imparting a black surface coating to brass workpieces is provided by an aqueous solution of cupric carbonate, an organic color intensifier, and ammonium hydroxide in an amount sufficient to provide a pH of about 11.0 to 12.5. The workpieces are immersed in the bath, preferably at ambient temperature, for a period of time sufficient to develop a uniform, deep black finish thereon. The color intensifier may be aliphatic and aromatic ketones, aliphatic and aromatic amines, aliphatic alcohols, oxidation-resistant hydroxybenzene compounds, aromatic phosphonic and sulfonic acids, and mixtures thereof.

19 Claims, No Drawings

COMPOSITION AND METHOD FOR PRODUCING BLACK COATING ON BRASS

BACKGROUND OF THE INVENTION

A commonly utilized formulation for the blackening of brass surfaces in a single step process is set forth in the METAL FINISHING GUIDEBOOK (Metals and Plastics Publications, Inc., Westwood, New Jersey) and comprises 1 pound copper carbonate, 1 quart ammonia, 2.5 quarts water and 175° F. temperature. Although this formulation has been used for many years, it is subject to some objections in that the workpiece coating produced by the process tends to be mottled and iridescent, with the color frequently being more blue-black than pure black. Generally, the formulation requires a bath temperature of about 80° C. for satisfactory operation, and an insufficient quantity of ammonia will hamper blackening while an excess of ammonia will cause brass stripping. The period of immersion required for the workpiece to develop a coating is generally two to four minutes.

If one attempts to operate the formulation at temperatures below 80° C., it is generally necessary to increase the concentration of cupric carbonate and there is a tendency for the coating to be more purple or gray-black in color.

Accordingly, it is an object of the present invention to provide a novel aqueous bath for blackening brass surfaces which may utilize cupric carbonate in relatively low concentration and which may be operated at ambient temperatures.

It is also an object to provide such a bath which is capable of providing a highly uniform, truly black adherent coating for brass surfaces in relatively short immersion times.

Another object of the present invention is to provide a novel method for blackening brass uniformly which utilizes such baths under defined operating conditions of temperature, pH and immersion time.

SUMMARY OF THE INVENTION

It has now been found that the foregoing and related objects may be readily attained by a bath for imparting a black surface coating to brass workpieces comprising an aqueous solution of about 35 to 135 grams per liter of cupric carbonate; about 1 to 30 grams, per 100 grams of cupric carbonate, of an organic color intensifier selected from the group consisting of aliphatic and aromatic carboxylic acids, aliphatic and aromatic aldehydes, aliphatic and aromatic ketones, aliphatic and aromatic amines, aliphatic alcohols, oxidation-resistant hydroxybenzene compounds, and aromatic phosphonic and sulfonic acids, and mixtures thereof; and ammonium hydroxide in an amount sufficient to provide a pH of about 11.0 to 12.5. Preferably the solution contains about 45 to 75 grams per liter of cupric carbonate, about 15 to 25 grams per 100 grams of cupric carbonate of organic intensifier, and has a pH of about 11.5 to 12.0. The organic color intensifier is preferably a carboxylic acid, especially an aliphatic polycarboxylic acid such as citric acid or tartaric acid.

The method of imparting a black surface finish to brass is comprised of the steps of dissolving in water reagents to form the aforementioned solution, maintaining the solution at a temperature of about 20 to 50° C. and immersing in the solution a workpiece having a brass surface for a period of time sufficient to develop a blackfinish thereon. Preferably, the bath is maintained at a temperature of 25–30° C.

DETAILED DESCRIPTION OF THE PREFERRED EMBODIMENTS

As indicated hereinbefore, the blackening bath useful in the practice of the present invention is comprised of an aqueous solution of cupric carbonate, a water-soluble color intensifier, and sufficient ammonium hydroxide to provide a desired level of alkalinity.

Although the theory of operation of the above formulation is not completely understood, it is believed that the color intensifier may be functioning catalytically to promote formation of the black copper oxide coating and/or, in some manner, performing as a mild oxydizing agent. Some of the polyfunctional color intensifiers may possibly be acting as chelating agents to remove impurities from the solution in the area of the black workpiece.

CUPRIC CARBONATE

The cupric carbonate ($CuCO_3$) is typically and easily provided in the form of commercial basic copper carbonate which contains equal molar weights of cupric carbonate and cupric hydroxide and has an average copper content of 55 percent by weight. While the cupric carbonate might be formed in situ in the bath from a copper compound and carbonic acid, means would have to be provided for removing any interfering radical from a copper compound other than cupric hydroxide, and it has generally been found simpler and cheaper to use the aforementioned basic copper carbonate.

Generally 35 to 135 grams of cupric carbonate are dissolved in each liter of solution and preferably 45 to 75 grams per liter. Amounts greater than 100 grams per liter produce no additional benefits, and amounts less than 35 grams per liter produce poor coloration and require excessively long immersion times.

COLOR INTENSIFIERS

The water-soluble organic color intensifiers useful in the practice of the present invention are selected from the group consisting of aliphatic and aromatic carboxylic acids, aliphatic and aromatic aldehydes, aliphatic and aromatic ketones, aliphatic and aromatic amines, aliphatic alcohols, oxidation-resistant hydroxybenzene compounds. aromatic phosphonic and sulfonic acids, and mixtures thereof.

Included in the carboxylic acid class are the monocarboxylic acids (e.g., latic, glycolic, gluconic, benzoic and nitrobenzoic acids), the polycarboxylic acids (e.g., oxalic, maleic, tartaric, malic, malonic, diglycolic, adipic, citric, ethylene diamine tetraacetic, and 2-terephthaloyl benzoic acids), the acid anhydrides (e.g., succinic and phthalic anhydrides), and the amino acids (e.g., aminoacetic acid). The aldehyde class includes such members as the butyl, anisic, cinnamic and 2,4-dichlorophenyl aldehydes and maltose, while the ketone class includes such members as acetone and methyl ethyl ketone. Members of the aliphatic alcohol class include the monohydroxy members (e.g., methanol, isopropanol, and glycol ethyl ether) as well as polyhydroxy members (e.g., glycerine). The amine class includes such members as ethylenediamine and o-toluidine, while the aromatic phosphonic and sulfonic acid class encompasses benzene phosphonic acid and toluene sulfonic acid. The oxidation-resistant hydroxybenzene class is composed of ring-hydroxy substituted compounds including phenol, resorcinol (m-dihydroxybenzene), p-hydroxbenzoic acid and salicylic acid (o-hydroxybenzoic acid) which exhibit little tendency to act as reducing agents and which are relatively active oxidizing agents compared to such hydroxybenzene compounds as pyrogallic acid (1,2, 3-trihydroxybenzene and hydroquinone (p-dihydroxybenzene).

Naturally, for the purpose of determining the suitability of an aromatic compound as a color intensifier when the compound has two functional groups and is properly classifiable both in the hydroxybenzene class and also another class, it is to be considered as a hydroxybenzene and required to meet the oxidation-resistant criterion set forth for members of the class. It should also be understood that, for the purpose of this description of the color intensifiers useful in the practice of the present invention, the term "aliphatic" has been used in its broadest sense to include generally all non-aromatic compounds and specifically to exclude aromatic compounds. Finally, it should be recognized that the carboxylic acids may be introduced into the solution as esters or salts provided that no interfering ions are thereby introduced into the solution and that the acids and various other compounds may react with the ammonium or other ions in the solution.

The preferred color intensifiers are the water-soluble carboxylic acids, and of these the aliphatic polycarboxylic acids have been found most useful in the practice of the invention. The citric and tartaric acids in particular are preferred for a number of reasons including their high solubility, easy handling, ecological biodegradability, and relatively low cost.

Generally 1 to 30 grams of color intensifier are used for each 100 grams of cupric carbonate, preferably 15 to 25 grams for each 100 grams of cupric carbonate. Amounts of color intensifier greater than 25 percent of the cupric carbonate weight are not helpful and in certain cases may even promote attack of the brass surface by the color intensifier. Amounts of color intensifier less than 1 percent of the cupric carbonate weight produce unsatisfactory deposits in terms of color and uniformity.

AMMONIUM HYDROXIDE

The ammonium hydroxide is present in an amount sufficient to provide a pH of about 11.0 to 12.5, and preferably about 11.5 to 12.0. It may be added as ammonium hydroxide reagent or generated in the bath by adding gaseous ammonia.

USE OF THE BATH

The pH of the blackening bath is maintained in the range of 11.0 to 12.5, and preferably about 11.5 to 12.0. Values of pH below 11.0 may result in a mottled coating while values of pH above 12.5 may be used so long as the workpiece is not attached at the higher levels; ease of handling and maintenance will generally dictate the use of a pH below about 12.0.

The bath is maintained at a temperature of from 20 to 50° C., preferably at ambient temperatures of 20 to 35° C. While higher temperatures promote faster reaction times and hence permit shorter immersion periods, they also cause the evolution of ammonia gas from the solution and hence stability of the bath. Mild agitation of the bath is recommended to insure dissolution of the bath components and a good flow of the bath about the workpiece surface to be darkened.

The workpieces are immersed in the bath for periods of about two to four minutes at ambient temperature to develop a satisfactory black finish although shorter time periods may sometimes be employed, particularly at elevated temperatures.

The coating developed on the brass surface can be varied from blue-black to almost jet black by variations in the bath composition and the operating conditions of the bath within the specified ranges. However, it is preferred that shade variations be obtained by variations primarily in the immersion times. Extremely elevated bath temperatures and/or very high pH increase the likelihood of attack on the brass surface and are not recommended. While the use of mild bath agitation promotes the uniformity and depth of the deposit, air agitation and excessive agitation which leads to the formation of eddy currents within the bath must be avoided.

BATH PREPARATION AND MAINTENANCE

The bath is prepared by mixing the cupric carbonate and color intensifier in the desired quantities with water sufficient to provide about one-third of the total liquid volume required. When a smooth slurry has formed, sufficient ammonia is added, either as gaseous ammonia or as liquid ammonium hydroxide, to raise the pH to the desired level. Water is then added with stirring to bring the solution to the proper operating level. After a waiting period of several minutes for the solution to stabilize, the pH is rechecked, and additional ammonia added as necessary. It may be desirable in some instances to add a small amount of a conventional, non-interfering surfactant such as sodium dodecyldiphenyl ether sulfonate, but this is generally not required.

Maintenance of the bath is simple and requires only periodic checking absent excessive contamination. To keep within the desired immersion time over a long period of bath usage, a first correction may be effected by gradually increasing the temperature up to the high limit of the preferred range (35° C.) If a slight reddish iridescence appears on the metal surface, the temperature may be raised slightly as just indicated and/or the pH may be slightly increased, and/or increased mild agitation may be provided to restore a full and deep black finish. If temperature and pH are raised to the upper levels of the preferred ranges and an excessive time is still required, an addition of 7.5 grams of the cupric carbonate/color intensifier mixture should be made per liter of bath. Periodically, any precipitate found at the bottom of the bath should be removed.

Illustrative of the present invention are the following specific examples wherein all parts are parts by weight unless otherwise specified.

EXAMPLE ONE

A blackening bath is prepared by mixing with 350 parts water 64 parts of cupric carbonate and 16 parts of citric acid. The bath pH is adjusted to 12.5 ± 0.1 with liquid ammonium hydroxide and the volume of the bath brought up to 1,000 parts. The bath is mildly agitated to insure thorough dissolution and mixing of the ingredients, and the temperature is determined to be 25°–30° C. Brass workpieces are immersed in the bath for 3–4 minutes at a temperature of 25–30° C. After being rinsed with water and dried, the workpieces have a uniform coating of a deep, dark black. Prior to drying, the black coating is rubbed with the index finger and not dislodged, thus indicating a high degree of adherence.

As a control, another brass workpiece is immersed in a bath of similar composition which omits only the citric acid. The black coating produced thereby is poor and distinctly non-uniform.

EXAMPLE TWO

A blackening bath is prepared by mixing with 350 parts water 60 parts of cupric carbonate and 15 parts tartaric acid. The bath pH is adjusted to 11.5 with liquid ammonium hydroxide and the volume of the bath brought up to 1,000 parts. The bath is mildly agitated to insure thorough dissolution and mixing of the ingredients. Brass plated workpieces are immersed in the bath for three minutes at a temperature of 25° C. After being rinsed with water and dried, the workpieces have a coating of a deep, dark black. The adhesion of the coating is also found to be excellent.

Thus, it can be seen from the detailed specification and the foregoing specific examples that the present invention provides a novel method and bath for blackening brass which is characterized by the economical use of a low copper carbonate level in the bath and by the ability to operate at ambient temperatures. The proper pH and immersion time ranges for the bath are relatively stable, and the coating produced by the bath is adherent and uniform in appearance and may be selected to be a deep, dark black.

I claim:

1. An aqueous bath for imparting a black surface coating to brass workpieces consisting essentially of an aqueous solution of:

about 35 to 135 grams per liter of cupric carbonate;

about 1 to 30 grams per 100 grams of cupric carbonate of an organic color intensifier selected from the group consisting of aliphatic and aromatic carboxylic acids, aliphatic and aromatic aldehydes, aliphatic and aromatic ketones, aliphatic and aromatic amines, aliphatic alcohols, oxidation-resistant hydroxybenzene compounds, aromatic phosphonic and sulfonic acids and mixtures thereof; and ammonium hydroxide in an amount sufficient to provide a pH of about 11.0 to 12.5.

2. The bath of claim 1 wherein said solution contains about 45 to 75 grams of said cupric carbonate per liter of solution.

3. The bath of claim 1 wherein said solution contains about 15 to 25 grams of said organic intensifier per 100 grams of cupric carbonate.

4. The bath of claim 1 wherein said solution has a pH of about 11.5 to 12.0.

5. The bath of claim 1 wherein said organic color intensifier is a carboxylic acid.

6. The bath of claim 5 wherein said organic color intensifier is an aliphatic polycarboxylic acid.

7. The bath of claim 6 wherein said organic color intensifier is tartaric acid.

8. The bath of claim 6 wherein said organic color intensifier is citric acid.

9. The bath of claim 1 wherein said solution contains about 45 to 75 grams per liter of cupric carbonate and about 15 to 25 grams of tartaric acid as said color intensifier per 100 grams of cupric carbonate, and has a pH of about 11.5 to 12.0.

10. The method of imparting a black surface finish to brass comprising the steps of dissolving in water reagents to form an aqueous solution consisting essentially of about 35 to 135 grams per liter of cupric carbonate, about 1 to 30 grams per 100 grams of cupric carbonate of an organic color intensifier selected from the group consisting of aliphatic and aromatic carboxylic acids, aliphatic and aromatic aldehydes, aliphatic and aromatic ketones, aliphatic and aromatic amines, aliphatic alcohols, oxidation-resistant hydroxybenzene compounds, aromatic phosphonic and sulfonic acids, and mixtures thereof; and ammonium hydroxide in an amount sufficient to provide a pH of about 11.0 to 12.5;

maintaining said solution at a temperature of about 20 to 50° C; and immersing in said solution a workpiece having a brass surface for a period of time sufficient to develop a black finish thereon.

11. The method of claim 10 wherein said solution is maintained at a temperature of 25 to 30° C.

12. The method of claim 10 wherein said solution contains about 45 to 75 grams of said cupric carbonate per liter of solution.

13. The method of claim 10 wherein said solution contains about 15 to 25 grams of said organic intensifier per 100 grams of cupric carbonate.

14. The method of claim 10 wherein said solution has a pH of about 11.5 to 12.0.

15. The method of claim 10 wherein said organic color intensifier is a carboxylic acid.

16. The method of claim 15 wherein said organic color intensifier is an aliphatic polycarboxylic acid.

17. The method of claim 16 wherein said organic color intensifier is tartaric acid.

18. The method of claim 16 wherein said organic color intensifier is citric acid.

19. The method of claim 10 wherein said solution contains about 45 to 75 grams per liter of cupric carbonate and about 15 to 25 grams of tartaric acid as said color intensifier per 100 grams of cupric carbonate, and has a pH of about 11.5 to 12.0.

* * * * *